US007001076B2

(12) United States Patent
Lustig et al.

(10) Patent No.: US 7,001,076 B2
(45) Date of Patent: Feb. 21, 2006

(54) HOUSING FOR RECEIVING A BEARING COMPONENT AND PROCESS FOR MANUFACTURING SAME

(75) Inventors: Wilfried Lustig, Hüde (DE); Matthias Gercke, Affinghausen (DE); Franz-Josef Marquardt, Osnabrück (DE); Sören Knopp, Ostercappeln (DE); Ralf Kunze, Bad Essen (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 0 days.

(21) Appl. No.: 10/808,026

(22) Filed: Mar. 24, 2004

(65) Prior Publication Data
US 2004/0180567 A1 Sep. 16, 2004

Related U.S. Application Data

(63) Continuation of application No. PCT/DE03/01684, filed on May 22, 2003.

(30) Foreign Application Priority Data
May 24, 2002 (DE) ............................ 102 23 306

(51) Int. Cl.
*F16C 23/04* (2006.01)
*B21D 39/00* (2006.01)
(52) U.S. Cl. .................. 384/208; 29/517; 403/274
(58) Field of Classification Search ........ 384/207–209; 403/274; 29/517
See application file for complete search history.

(56) References Cited

U.S. PATENT DOCUMENTS

| 1,576,874 | A |   | 3/1926 | Stevens |             |
|-----------|---|---|--------|---------|-------------|
| 1,823,158 | A | * | 9/1931 | Spatta et al. | ......... 403/274 |
| 4,097,163 | A | * | 6/1978 | Dubuque | ............. 403/274 |
| 4,523,872 | A | * | 6/1985 | Arena et al. | ........... 29/517 |
| 4,763,922 | A | * | 8/1988 | Nishikawa | ............ 29/517 |
| 5,536,100 | A | * | 7/1996 | Kiefer | ................ 403/274 |
| 5,606,790 | A | * | 3/1997 | Laue | .................... 29/517 |

FOREIGN PATENT DOCUMENTS

GB          2 162 472           2/1986

* cited by examiner

*Primary Examiner*—Thomas R. Hannon
(74) *Attorney, Agent, or Firm*—McGlew & Tuttle, P.C.

(57) ABSTRACT

A housing for receiving a bearing component is presented, which has a shaft projection, which can be inserted into the recess of the end area of a hollow section and can be pressed together with the end area, wherein the shaft projection is provided with a groove profile, in which the groove profile is prepared by a deformation process or an original shaping process. Notch effect and consequently a weakening of the cross section on the highly stressed shaft projection is avoided by the said processes. The present invention pertains, moreover, to such a groove profile located at a shaft projection of a housing.

20 Claims, 2 Drawing Sheets

HOUSING FOR RECEIVING A BEARING COMPONENT AND PROCESS FOR MANUFACTURING SAME

CROSS REFERENCE TO RELATED APPLICATION

This is a continuation of and claims the benefit (35 U.S.C. §120 and 35 U.S.C. §365(c)) of copending International Application PCT/DE 03/01684 of May 22, 2003, which designated inter alia the United States and which claims the priority of German Application DE 102 23 306.3 of May 24, 2002. The entire contents of each application is hereby incorporated by reference in its entirety.

FIELD OF THE INVENTION

The present invention pertains to a housing for receiving a bearing component with a shaft projection, which can be inserted into a recess of an end area of a hollow section and can be pressed together with an end area, wherein the shaft projection is provided with a groove profile. The present invention also pertains to a process for manufacturing a housing for receiving a bearing component with a groove profile, wherein the groove profile is arranged at a shaft projection of the housing, which can be inserted into the recess of the end area of the hollow section and can be pressed together with the end area.

BACKGROUND OF THE INVENTION

Various designs of housings of this type have been known from the state of the art and are preferably needed as components for manufacturing chassis elements in the automobile industry. The connection between the shaft projection of the housing and a preferably tubular-shaped hollow section may be brought about by welding, screwing or pressing. During the pressing together of the components, a groove profile is prepared on the shaft projection rotationally symmetrically to the central longitudinal axis of the shaft projection, and it contains a number of groove-like depressions. During the connection between the housing shaft projection and the tube end, the inner surface of the cavity of the tube is adapted to the groove profile of the shaft projection by means of a suitable pressing operation, so that a subsequent pulling off of the tube end from the shaft projection is ruled out.

Even though this type of press connection has proved, in principle, to be successful, it does have system-related drawbacks concerning its strength properties. These drawbacks are essentially that a significant notch effect is brought about in the transition area between the machined shaft projection and the housing with its nonmachined surface by the machining operation, within the framework of which the groove profile is prepared in the shaft projection, which has an unfavorable effect on the strength properties of the housing shaft projection. Moreover, the manufacture of the groove profile is relatively complicated because of the machining time needed for it and is thus associated with rather substantial costs. The rotationally symmetrical design of the groove profile offers, moreover, only limited safety against torsion of the connection between the housing shaft and the tube end during a torsional stress on the connected components.

SUMMARY OF THE INVENTION

The object of the present invention is therefore to provide a housing of this type for receiving a bearing component, which meets increased requirements on the strength of the connection between the shaft projection of the housing in question and the hollow section to be connected thereto. Moreover, it is additionally necessary to accomplish the object of providing a securing against torsion between the housing shaft and the end of the hollow section especially under increased torsional stress.

The objects described are accomplished according to the present invention by the technical teaching disclosed in the Description of the Preferred Embodiment below concerning the process.

According to the present invention, the groove profile is no longer prepared within the framework of the machining operation, as is known from the state of the art, but the groove profile is prepared within the framework of a non-cutting processing by means of a deformation process or by means of an original shaping process.

The deformation process may be carried out according to the forging technique.

Moreover, provisions are made in a second, independent solution for the groove profile to be prepared according to the casting process. This process is especially inexpensive for larger lot numbers, because the overall manufacture of the housing component with the shaft projection and the groove profile can be carried out in one operation, without additional manufacturing steps being necessary for the separate shaping of the groove profile. If the groove profile manufactured according to the deformation or original shaping process shall attain additional strength, the strength of the shaft projection can be increased by additional measures for introducing residual compressive stress into the boundary layer of the groove profile, e.g., by shot peening or cold calibration.

The present invention will be explained once again in greater detail below on the basis of an exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

DESCRIPTION OF THE PREFERRED EMBODIMENT

Figure 1:
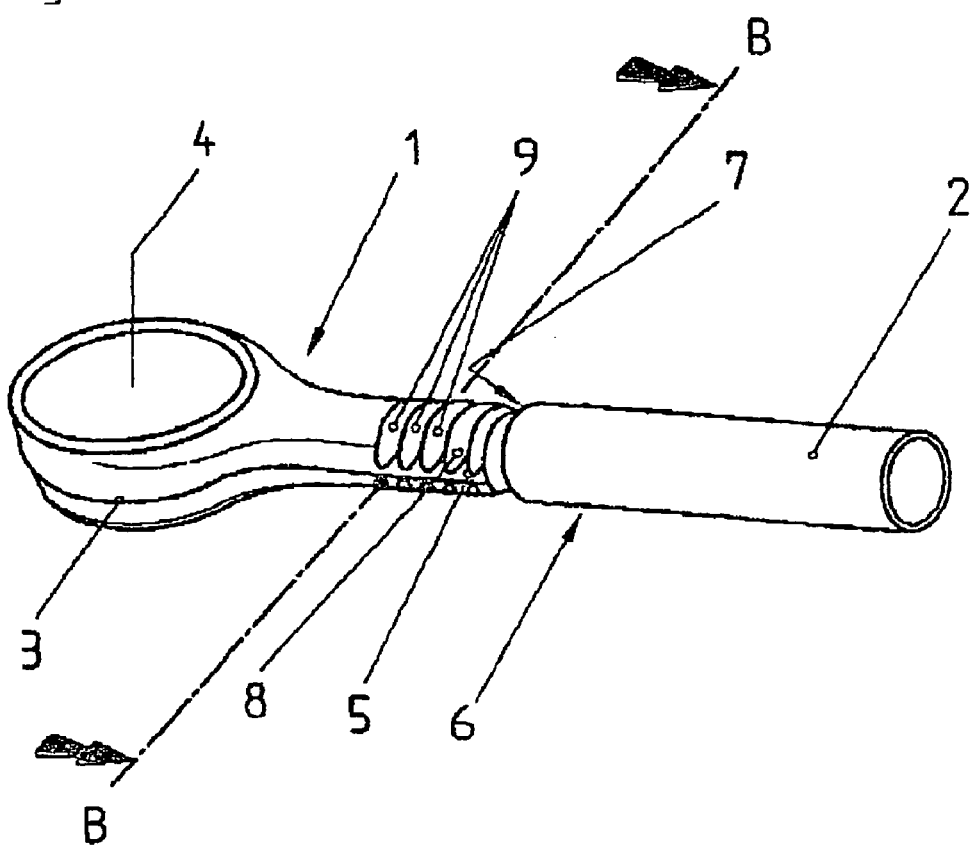
FIG. 1 is a perspective exploded view of the housing according to the present invention together with the free end of a hollow section to be connected thereto.

Referring to the drawing in particular, The housing shown in FIG. 1 with a tubular hollow section 2, which is designated as housing 1 in its entirety, comprises essentially an annular receiving element 3 for a bearing component not specifically shown in the drawing. The bearing component is inserted into a through hole 4, which is recessed in the receiving element 3. Projecting on one side, a shaft projection 5 is located at the annular receiving element 3, the said shaft projection 5 being received in the assembled state between the housing and the hollow section in the recess 7 of the end area 6 of the hollow section 2, which said recess is ring-shaped in this case.

The external dimension of the shaft projection 5, which has an essentially round cross section, is selected to be such that the said shaft projection can be pushed into the recess 7 of the hollow section 2 without difficulty. After pushing in, the end area 6 of the hollow section 2 is pressed together by a suitable pressing device, and the application of a sufficiently strong force causes the inner contour of the recess 7 to adapt itself to the outer contour of the shaft projection 5. This outer contour of the shaft projection 5 is provided with a groove profile 8, which is formed from a plurality of depressions 9, preferably three to eight, arranged next to each other in the axial longitudinal direction of the shaft projection 5.

Figure 2:
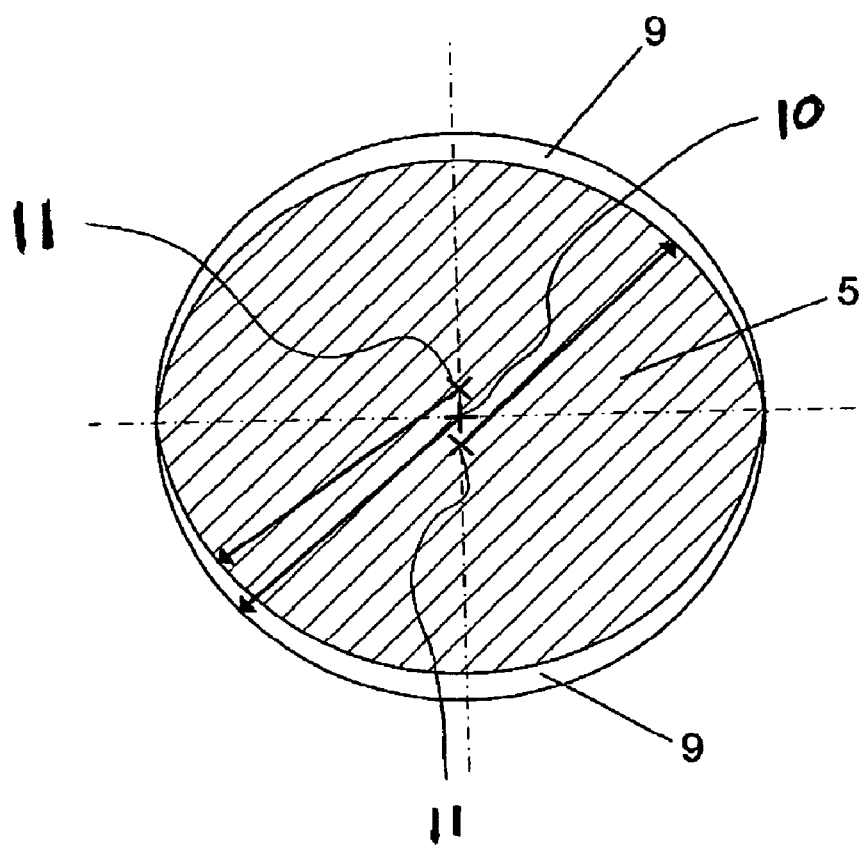
FIG. 2 is a cross-sectional view of the shaft projection of the housing corresponding to section line B—B in FIG. 1.

As can be determined from the view in FIG. 2, which shows a cross-sectional view corresponding to line B—B in FIG. 1, two depressions 9 are distributed along the circumference in a circle segment-shaped pattern on mutually opposite sides of the shaft projection in the exemplary embodiment being shown and they extend over a circle segment angle of about 80°–140° each which 120° being preferred. The circle segment-shaped arrangement of the depressions 9 causes that twisting between the components connected to one another as a consequence of torsional forces is reliably ruled out after the assembly of the hollow section 2 with the shaft projection 5 of the housing 1 and after the associated positive-locking connection between the outer contour of the shaft projection 5 and the inner wall of the hollow section 2. As shown in FIG. 2, the shaft projection has a center 10. The depressions 9 with their circular segment shapes have centers of curvature 11 which are offset from the center 10 of the shaft projection 5.

To avoid notch effects caused by the depressions 9 in the area of the shaft projection 5, the depressions 9 are prepared according to the present invention either according to the deformation process or within the framework of an original shaping operation for the entire housing. The deformation process may be, e.g., a forging operation, and the original shaping operation may be a casting operation.

While a specific embodiment of the invention has been shown and described in detail to illustrate the application of the principles of the invention, it will be understood that the invention may be embodied otherwise without departing from such principles.

What is claimed is:

1. A housing for receiving a bearing component comprising:
    a shaft projection including a groove profile prepared according to a one of a forging operation and an original shaping process which includes a casting operation;
    a hollow section including an end area with a recess, said shaft projection being inserted into said recess and pressed together with said end area.

2. A housing for receiving a bearing component in accordance with claim 1, wherein residual compressive stresses are introduced into the boundary layer of said groove profile.

3. A housing for receiving a bearing component in accordance with claim 1, wherein:
    an annular receiving element is connected to said shaft projection with said shaft projection extending radially outward from one side of said annular receiving element, said annular receiving element defining a through hole.

4. A housing for receiving a bearing component in accordance with claim 1, wherein:
    said shaft projection formed of a solid material.

5. A housing for receiving a bearing component in accordance with claim 1, wherein:
    said groove profile is formed by a non-cutting process.

6. A housing for receiving a bearing component, the housing comprising:
    a shaft projection having a substantially round cross section with a center and including a groove profile prepared according to a deformation process or an original shaping process, said groove profile further comprising a plurality of depressions arranged next to each other in an axial longitudinal direction of said shaft projection and distributed in a circle segment-like pattern over circumference of said shaft projection, said circle segment-like pattern having a center of curvature offset from said center of said substantially round cross section;
    a hollow section including an end area with a recess, said shaft projection being inserted into said recess and being pressed together with said end area.

7. A housing for receiving a bearing component in accordance with claim 6, wherein said circle segment-like pattern has angular extension characteristics in the range of 80° to 140°.

8. A housing for receiving a bearing component in accordance with claim 6, wherein three to eight of said depressions are arranged next to each other in axial longitudinal direction of said shaft projection.

9. A housing for receiving a bearing component in accordance with claim 6, further comprising:
    another plurality of depressions are distributed in a circle segment-like pattern over said circumference of said shaft projection and are arranged diametrically opposite said plurality of depressions, said center of said substantially round cross section being arranged between said center of curvature of said circle segment-like pattern of said plurality of depressions and a center of curvature of said circle segment-like pattern of said another plurality of depressions.

10. A housing for receiving a bearing component in accordance with claim 9, wherein:
    said centers of curvature of said circle segment-like pattern of said plurality of depressions and said circle segment-like pattern of said another plurality of depressions are arranged between said center of said substantially round cross section and an outside of said shaft projection.

11. A housing for receiving a bearing component in accordance with claim 6, wherein:
    an annular receiving element is connected to said shaft projection with said shaft projection extending radially outward from one side of said annular receiving element, said annular receiving element defining a through hole.

12. A housing for receiving a bearing component in accordance with claim 6, wherein:
    said shaft projection formed of a solid material.

13. A housing for receiving a bearing component in accordance with claim 6, wherein:
    said groove profile is formed by a non-cutting process.

14. A housing for receiving a bearing component in accordance with claim 6, further comprising:

residual compressive stresses incorporated into the boundary layer of said groove profile.

15. A housing for receiving a bearing component, the housing comprising:

a shaft projection having a substantially round cross section with a center of curvature, a circumferential direction and an axial longitudinal direction, said shaft projection defining a plurality of depressions on an outside of said shaft projection, each said depression being shaped as a segment of a circle extending in said circumferential direction of said shaft projection, a center of curvature of said segments of a circle being spaced from said center of curvature of said substantially round cross section, said depressions being arranged next to each other in said axial longitudinal direction of said shaft projection;

a hollow section including an end area with a recess, said shaft projection being arranged in said recess and being pressed together with said end area.

16. A housing for receiving a bearing component in accordance with claim 15, further comprising:

another plurality of depressions arranged on an outside of said shaft projection diametrically opposite said plurality of depressions, each of said another depressions being shaped as a segment of a circle and extending in said circumferential direction of said shaft projection, a center of curvature of said another segments of a circle being spaced from said center of curvature of said substantially round cross section;

said center of curvature of said substantially round cross section being arranged between said centers of curvature of said plurality of depressions and said another plurality of depressions.

17. A housing for receiving a bearing component in accordance with claim 16, wherein:

said centers of curvature of said plurality of depressions and said another plurality of depressions are arranged between said center of curvature of said substantially round cross section and said outside of said shaft projection.

18. A housing for receiving a bearing component in accordance with claim 15, further comprising:

an annular receiving element connected to said shaft projection with said shaft projection extending radially outward from one side of said annular receiving element, said annular receiving element defining a through hole.

19. A housing for receiving a bearing component in accordance with claim 15, wherein:

said plurality of depressions are formed by a non-cutting process.

20. A housing for receiving a bearing component in accordance with claim 15, further comprising:

residual compressive stresses incorporated into the boundary layer of said groove profile.

* * * * *